United States Patent
Olsson et al.

(10) Patent No.: US 11,123,601 B2
(45) Date of Patent: Sep. 21, 2021

(54) APPARATUS FOR OMNIDIRECTIONAL LOCOMOTION

(71) Applicant: SONY MOBILE COMMUNICATIONS INC., Tokyo (JP)

(72) Inventors: Henrik Olsson, Lund (SE); Sven-Erik Dahlrot, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/316,610

(22) PCT Filed: Sep. 6, 2016

(86) PCT No.: PCT/EP2016/071000
§ 371 (c)(1),
(2) Date: Jan. 9, 2019

(87) PCT Pub. No.: WO2018/046077
PCT Pub. Date: Mar. 15, 2018

(65) Prior Publication Data
US 2019/0224521 A1    Jul. 25, 2019

(51) Int. Cl.
*A63B 22/02*    (2006.01)
*A63B 22/00*    (2006.01)
(Continued)

(52) U.S. Cl.
CPC ........ *A63B 22/025* (2015.10); *A63B 22/0023* (2013.01); *A63B 22/0285* (2013.01);
(Continued)

(58) Field of Classification Search
CPC ............ A47B 2220/06; A63B 2210/00; A63B 2210/02; A63B 22/02; A63B 22/0235; A63B 2022/0271; A63B 2022/0278
See application file for complete search history.

(56) References Cited

U.S. PATENT DOCUMENTS 3,451,526 A * 6/1969 Fernandez ............. B65G 47/53
198/370.03
5,490,784 A * 2/1996 Carmein ................ A63B 22/02
434/29
(Continued)

FOREIGN PATENT DOCUMENTS

CN    203447687 U    2/2014
CN    103961840 A    8/2014
(Continued)

OTHER PUBLICATIONS

International Search Report and Written Opinion from corresponding International Application No. PCT/EP2016/071000, dated May 15, 2017; 11 pages.

*Primary Examiner* — Garrett K Atkinson
*Assistant Examiner* — Zachary T Moore
(74) *Attorney, Agent, or Firm* — Tucker Ellis LLP (57) ABSTRACT

An apparatus, e.g. an omnidirectional treadmill, is configured to allow a user to move in an arbitrary direction. The apparatus comprises a platform (1) including a frame with a planar support surface for the user, and a continuous sheet (3) arranged to enclose the frame while extending along the planar support surface so as to define a moveable active surface (5). The apparatus further comprises a drive arrangement arranged in frictional contact with the sheet (3) to drive the sheet (3), and thus the active surface (5), in a given direction (D') in relation to the planar support surface. The drive arrangement comprises at least three drive units (20) distributed around the frame, each drive unit (20) compris- (Continued)

ing a drive roller (21) arranged to rotatingly engage the sheet (3) in abutment to a circumferential edge surface (6) of the frame so as to establish the frictional contact with the sheet (3).

20 Claims, 5 Drawing Sheets

(51) Int. Cl.
    *A63B 24/00*     (2006.01)
    *A63B 71/06*     (2006.01)
    *G06F 3/01*     (2006.01)

(52) U.S. Cl.
    CPC .......... *A63B 24/0087* (2013.01); *G06F 3/011* (2013.01); *A63B 2022/0271* (2013.01); *A63B 2024/0093* (2013.01); *A63B 2071/0638* (2013.01); *A63B 2210/10* (2013.01); *A63B 2220/13* (2013.01); *A63B 2220/72* (2013.01); *A63B 2220/75* (2013.01); *A63B 2220/76* (2013.01); *G06F 2203/012* (2013.01)

(56) References Cited

U.S. PATENT DOCUMENTS

| | | | | |
|---|---|---|---|---|
| 5,562,572 A | * | 10/1996 | Carmein | A61H 3/00 |
| | | | | 482/4 |
| 6,152,854 A | * | 11/2000 | Carmein | A63B 22/025 |
| | | | | 482/4 |
| 7,399,258 B1 | * | 7/2008 | Sugar | A63B 22/0235 |
| | | | | 482/51 |
| 9,829,070 B2 | * | 11/2017 | Batten, Jr. | G09B 9/00 |
| 2010/0170769 A1 | * | 7/2010 | Jung | A63B 22/02 |
| | | | | 198/570 |
| 2018/0217662 A1 | * | 8/2018 | Smoot | G06F 3/0334 |

FOREIGN PATENT DOCUMENTS

| | | | |
|---|---|---|---|
| CN | 204723675 U | | 10/2015 |
| JP | 2004157329 A | * | 6/2004 |
| JP | 2004157329 A | | 6/2004 |
| WO | 2007139672 A2 | | 12/2007 |

\* cited by examiner

APPARATUS FOR OMNIDIRECTIONAL LOCOMOTION

TECHNICAL FIELD

The present invention relates generally to devices that allow a user to perform locomotive motion in any direction, e.g. by walking, running, crawling or rolling. Such a device is commonly known in the art as an omnidirectional treadmill (ODT).

BACKGROUND ART

An omnidirectional treadmill is a mechanical device that allows for 360 degrees of locomotive movement by a user positioned on an active surface of the treadmill. Omnidirectional treadmills are typically motorized and operated by a control system so as to move the active surface under the user in synchronization with the locomotive movement of the user so as to maintain the user at a specific position on the treadmill. In other words, no matter which way the user moves, the active surface under the user will be controlled to move in the opposite direction. Thus, in contrast to traditional fitness-oriented treadmills that are designed to be linear (moving in one direction), omnidirectional treadmills need to be designed to give free movement to its user in a horizontal plane.

Omnidirectional treadmills are, e.g., suggested for use in immersive virtual environment implementations ("virtual reality", VR) to allow unencumbered movement within a virtual space. Thus, the treadmill maintains the user in standstill position in the physical environment while giving the user the ability of limitless locomotive movement in the virtual space. Omnidirectional treadmills may also be employed for human rehabilitation, simulation, training, exercise, etc.

The mechanical design of an omnidirectional treadmill is typically quite complex. A large number of different examples are given in U.S. Pat. No. 6,152,854. In one example, the active surface is formed by the intersection between a closed-loop drive belt, which is driven to move in a first direction similar to the belt of a conventional linear treadmill, and an overlapping closed-loop roller belt which is formed by multiple parallel rows of cylindrical rollers that are moved in a second direction at right angles to the first direction. In a variant, the closed-loop roller belt is formed by a flexible cable upon which is strung a multitude of freely moveable beads. In another example, the active surface is covered by a large number of so-called omnidirectional wheels that are alternately arranged with their power axis in a first direction and a second direction at right angles to the first direction. All of these constructions of the active surface involve a large number of actuated parts and therefore suffer from an elevated risk for mechanical failure and high component cost. They are also likely to generate clatter and other disturbing noise during operation.

U.S. Pat. No. 6,152,854 discloses yet another alternative structure of an omnidirectional treadmill which employs a moveable, continuous sheet that is wrapped around a flattened, solid spheroid. The sheet is held onto the spheroid by its own elasticity. By sliding the sheet around the spheroid, the flat top portion of the spheroid will serve as an active surface. The active surface is controllably actuated by frictional contact between the sheet and a steerable roller which is located centrally beneath the flat bottom portion of the spheroid. The roller is independently steerable about two axes to generate a thrust vector by the frictional contact and to direct the thrust vector in a full circle, respectively. While this design proposal has the potential of overcoming the drawbacks listed above, it introduces a number of practical difficulties. For example, it is a significant challenge to reduce friction between the sheet and the spheroid, especially since the weight of the user presses the sheet towards the flattened top surface of the spheroid and since the sheet needs to be stretched around the rounded edge surface of the spheroid. Further, it is a challenge to establish sufficient frictional contact between the steerable roller and the sheet and to achieve a fast movement response of the active surface to the thrust vector generated by the steerable roller. For example, if the steerable roller is pressed hard against the sheet to increase frictional contact, the sheet will simultaneously be pressed against the flat bottom surface, causing friction that restrains movement of the sheet around the spheroid. Further, the design of the treadmill does not allow the active surface to be rotated, e.g. to untwine cables that are connected to the user or to user-worn equipment and that have become entangled by the user's movement on the active surface.

BRIEF SUMMARY

It is an objective of the invention to at least partly overcome one or more limitations of the prior art.

Another objective is to provide an apparatus for omnidirectional locomotion of relatively simple and robust construction.

A further objective is to provide an apparatus for omnidirectional locomotion with fast movement response.

One or more of these objectives, as well as further objectives that may appear from the description below, are at least partly achieved by an apparatus according to the independent claims, embodiments thereof being defined by the dependent claims.

According to one aspect of the invention, there is provided an apparatus for allowing a user to move in an arbitrary direction. The apparatus comprises a frame that comprises a planar support surface for the user and defines a perimeter as seen in a direction towards the planar support surface, a continuous sheet arranged to enclose the frame while extending along the planar support surface so as to define a moveable, active surface overlying the planar support surface, and a drive arrangement arranged in frictional contact with the sheet so as to cause the continuous sheet, and thereby the active surface, to be driven in a given direction in relation to the planar support surface. The drive arrangement comprises at least three drive units distributed around the perimeter of the frame, each drive unit comprising a drive roller arranged to rotatingly engage the sheet in abutment to a circumferential edge surface of the frame so as to establish the frictional contact with the continuous sheet.

The apparatus employs a small number of actuated parts to provide the movable active surface. Basically, a continuous sheet is wrapped around the frame and driven to move around the frame by frictional contact at three or more spaced apart regions around the perimeter of the frame. With this basic design, the apparatus is simple and robust. By arranging the drive units to establish the frictional contact with the circumferential edge surface, i.e. in the vicinity of the active surface and in a region with relatively high tension in the continuous sheet, a fast movement response is achieved. In other words, the time period from a rotation of a drive roller to a movement of the active surface is small.

By driving the movement of the sheet by frictional contact at the edge surface, it is possible to employ a frame in the shape of a shell with an open bottom. This will reduce the weight of the apparatus, the friction between the sheet and the frame, and potentially facilitate handling and assembly.

The various embodiments described in the following provide additional technical effects and advantages, including providing simple and efficient movement control of the active surface, reducing friction between the sheet and the frame, improving the transfer of energy to the sheet by the frictional contact, providing firm support of the combination of sheet and frame, enabling inclination control of the active surface, facilitating assembly of the apparatus, and enhancing the experience of the user when moving on the active surface.

In one embodiment, the respective drive unit is configured for rotation of the drive roller around a first axis, which is a symmetry axis of the drive roller, wherein the respective drive unit is further configured for rotation of the drive roller around a second axis, which is perpendicular to the first axis, and wherein the respective drive unit is arranged with the second axis being located in a radial direction of the frame as seen in a direction towards the planar support surface. Further, the respective drive unit may be arranged with the second axis being essentially perpendicular to a tangential plane of the circumferential edge surface at the location of the frictional contact between the drive roller and the continuous sheet.

Alternatively or additionally, in some embodiments, the drive unit is arranged such that the rotation of the drive roller around the first axis drives the continuous sheet, and the rotation of the drive roller around the second axis at least partly controls the continuous sheet to be driven in the given direction.

Alternatively or additionally, in some embodiments, the respective drive unit comprises a first motor arranged to rotate the drive roller around the first axis and a second motor arranged to rotate the drive roller around the second axis. Further, the first motor may be integrated within the drive roller.

In one embodiment, the frame comprises a plurality of rotatable inner support elements arranged in surrounding relation to the planar support surface to define the circumferential edge surface of the frame, wherein the drive roller of the respective drive unit is arranged to rotatingly engage the continuous sheet in abutment to one or more of the rotatable inner support elements so as to establish the frictional contact with the continuous sheet. Further, each of the rotatable inner support elements may comprise one or more omnidirectional wheels and may be arranged to allow the continuous sheet to move in any direction in contact with the respective rotatable inner support element. Further, each omnidirectional wheel may have a main axis at its center and idler rollers arranged around its circumference, each idler roller defining a minor rotation axis which is perpendicular to the main axis and oriented in a tangential direction of the circumference. Still further, each omnidirectional wheel may be arranged with the main axis oriented in a tangential direction of the perimeter of the frame.

Alternatively or additionally, in some embodiments, the rotatable inner support elements are arranged such that a top of the circumferential edge surface is level with or extend slightly above the planar support surface.

Alternatively or additionally, in some embodiments, the apparatus further comprises a plurality of rotatable outer support elements arranged to engage the continuous sheet in abutment to the rotatable inner support elements. Further, center points of the rotatable inner support elements may be located in a horizontal plane, and at least one of the drive rollers and the rotatable outer support elements may be arranged in abutment to the rotatable inner support elements beneath the horizontal plane. Further, the drive rollers and the rotatable outer support elements may be arranged in abutment to the rotatable inner support elements at locations displaced from the horizontal plane. Alternatively or additionally, the drive rollers and the rotatable outer support elements may be arranged in abutment to the rotatable inner support elements on opposite sides of the horizontal plane.

Alternatively or additionally, in some embodiments, at least a subset of the rotatable outer support elements are included in the drive units.

Alternatively or additionally, in some embodiments, each of the rotatable outer support elements comprises one or more omni-directional wheels and is arranged to allow the continuous sheet to move in any direction in contact with the respective rotatable outer support element.

Alternatively or additionally, in some embodiments, the frame is generally shaped as an inverted tray, wherein a bottom of the tray defines at least part of the planar support surface, and wherein holders for the plurality of rotatable inner support elements project from the bottom to generally define a sidewall of the tray.

In one embodiment, at least one of the planar support surface and an inner surface of the continuous sheet facing the planar support surface is configured to reduce contact friction.

In one embodiment, the planar support surface comprises a plurality of freely rotatable spherical balls located in seats that are dispersed across the planar support surface.

In one embodiment, an outer surface of the continuous sheet facing away from the frame comprises a surface material and/or surface structure for friction enhancement.

In one embodiment, the continuous sheet is made of elastic material.

In one embodiment, the perimeter of the frame is generally circular as seen towards the planar support surface.

In one embodiment, the continuous sheet is tightly wrapped around the frame so as to form a flattened spheroid. In an alternative embodiment, the surface area of the continuous sheet that faces the frame exceeds the surface area of a three-dimensional contour of the frame, and the continuous sheet is stretched across the planar support surface by forces applied onto the continuous sheet at the perimeter of the frame, wherein the continuous sheet is slacked beneath the frame.

In one embodiment, the apparatus further comprises a positioning system for determining a current position of the user on the active surface, and a controller configured to control the drive arrangement, based on the current position of the user, to move the continuous sheet so as to set the user in a given position within the active surface.

In one embodiment, a controller is configured to collectively operate the drive rollers to impart a downward force onto the frame by the frictional contact.

In one embodiment, the drive units are included in a floor-mounted chassis comprising displacement units for imparting a movement of the respective drive unit in a vertical direction and in a horizontal direction, respectively, and a controller is operable to control at least a subset of the displacement units to cause a movement of at least one of the drive units in the vertical direction to impart an inclination of the frame and to cause a movement of one or more of the drive units in the horizontal direction to maintain the frictional contact between the drive rollers and the continuous sheet. Further, the floor-mounted chassis may comprise a floor-mounted part and an intermediate part which is spaced from the floor-mounted part, the drive units may be attached to the intermediate part, and the displacement units for causing the movement of the respective drive unit in the vertical direction may be arranged to interconnect the floor-mounted part and the intermediate part and operable, by the controller, to impart said inclination to the intermediate part, and thereby to the drive units and the frame.

In one embodiment, the continuous sheet comprises a pouch with an opening and a cover configured to be fitted to the pouch to cover the opening, and wherein the frame comprises a plurality of interlocking elements that collectively define the frame, each of the interlocking elements being configured to fit within the opening of the pouch.

In one embodiment, the apparatus further comprises a climate chamber for controlling one or more of temperature, humidity, and air speed, wherein the active surface is arranged to define at least part of a floor in the climate chamber.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Figure 1:
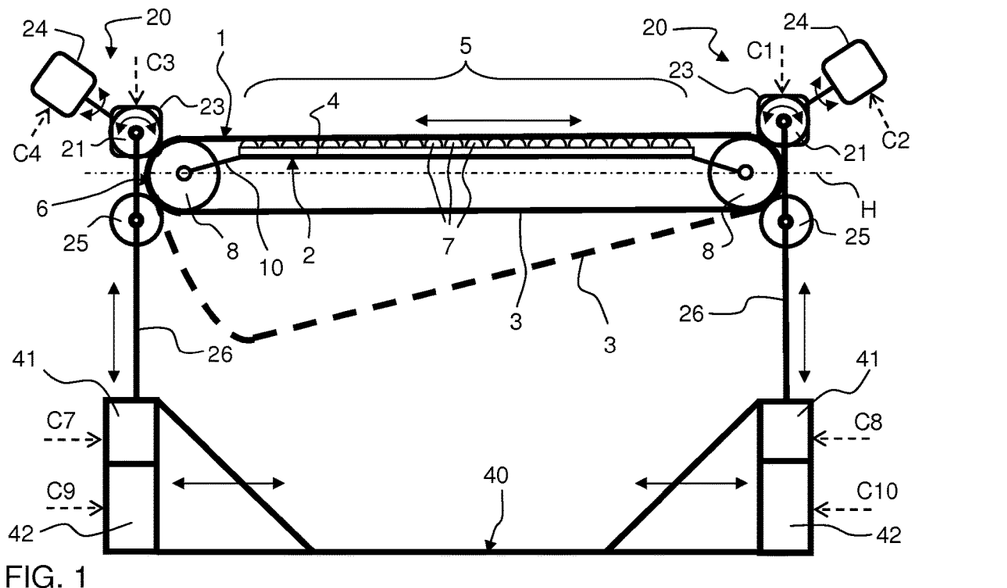
FIG. 1 is a schematic side view of an omnidirectional treadmill according to an embodiment.
Figure 2:
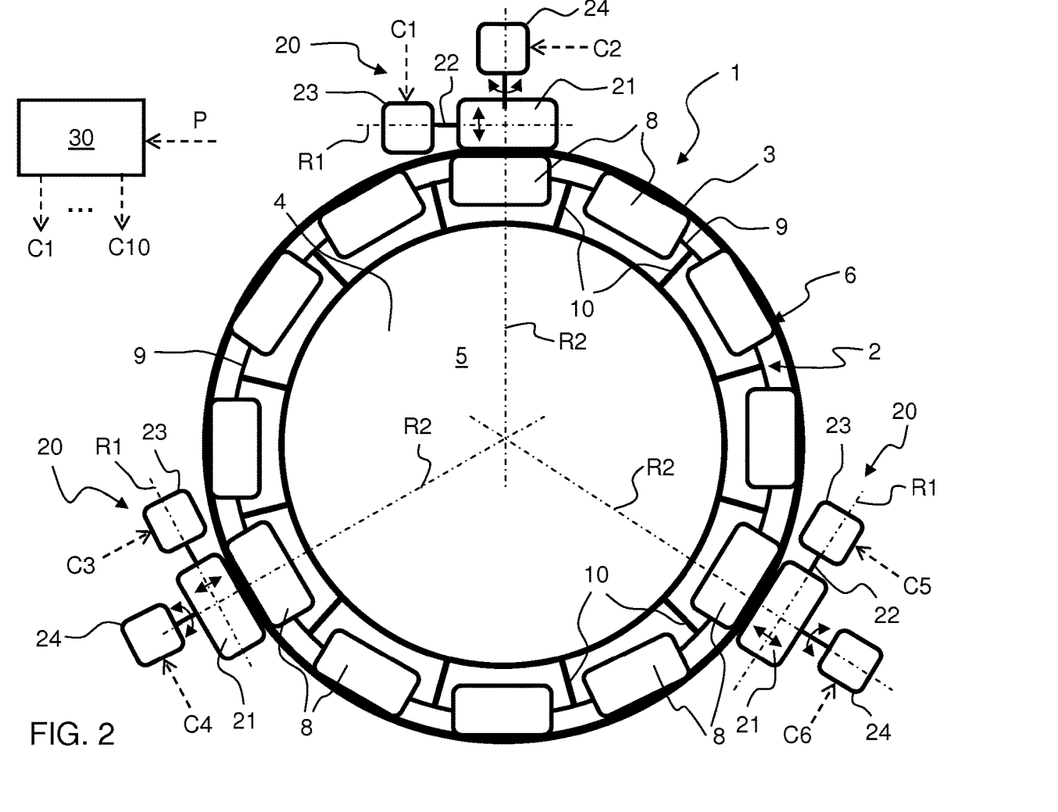
FIG. 2 is a top plan view of an omnidirectional treadmill according to an embodiment.

FIGS. 1-2 show examples of an omnidirectional treadmill configured in accordance with an embodiment of the present invention. It should be noted that while the examples include similar components, the arrangement of the components differ slightly between the examples. FIG. 1 is a schematic elevated side view in which an outer sheet of a platform is made transparent to show internal components. FIG. 2 is a schematic top plan view in which the outer sheet is also made transparent.

In both examples, the treadmill comprises a platform 1 having an outer, omnidirectionally moveable surface. The platform 1 is formed by a rigid inner frame 2 which is completely enclosed by a sheet 3 in the shape of a sealed bag or pouch. The sheet 3 is typically made of elastic material, such as rubber or plastics, and may be selectively provided with surface structures or surface layers in these or other materials to enhance or reduce friction where appropriate. The inner frame 2 includes a planar support surface 4, which defines the active surface 5 of the treadmill, i.e. the region in which the user is allowed to perform locomotive omnidirectional movement. The frame 2 defines a rounded edge surface 6 at the outer perimeter of the platform 1. The edge surface 6 has preferably the shape of an arc of a circle, as seen in side view (FIG. 1). The outer perimeter is essentially circular in plan view (FIG. 2). The sheet 3 is arranged to be tightened across the support surface 4 and to slide along the support surface 4 and the edge surface 6. Thus, the sheet 3 may be seen to define an endless belt in all directions on the support surface 4. In a first implementation, shown by solid lines in FIG. 1, the sheet 3 is stretched around the contour of the frame 2, e.g. to the shape of a flattened sphere. In a second implementation, shown by dashed lines in FIG. 1, the inner surface area of the sheet 3 is larger than the contour of the frame 2 and is locally tightened across the support surface 4 and along the edge surface 6, while being otherwise slacked and thereby hanging down from the frame 2. The second implementation has the advantage of evening or distributing the stresses in the sheet 3 at the edge surface 6 and also facilitates manufacture of the platform 1, e.g. the process of arranging the frame 1 within the sheet 3.

To facilitate the sliding motion of the sheet 3 around the frame 2, the edge surface 6 is configured to project above the support surface 4, so as to locate the sheet 3 with a spacing to the support surface 4. The sliding motion of the sheet 3 is further improved by horizontal bearings 7 that are distributed across the support surface 4 to face the sheet 3. Each horizontal bearing 7 includes a spherical ball which is located for free rotation in a seat. The horizontal bearings 7 will reduce friction when the sheet 3 is pressed against the support surface 4 by the weight of the user. To further facilitate the sliding motion, the inner surface of the sheet 3 may be provided with a low friction structure/layer.

As indicated in FIGS. 1 and 2, the edge surface 6 and thus the perimeter of the frame 2 is preferably defined by a plurality of inner support elements or inner rollers 8, which are freely rotatable around a respective main axis. This will further improve the sliding motion of the sheet 3 around the frame 2, especially in view of the fact that the sheet 3 is actuated to move by frictional contact at the edge surface 6 (see below). As seen in FIG. 2, the inner rollers 8 generally have the contour of a cylinder and are distributed along the perimeter of the frame 2 to define the edge surface 6. Thus, the main axes of the inner rollers 8 are arranged to define a circle, as seen in plan view towards the platform 1. As seen in FIG. 2, the inner rollers 8 are arranged for free rotation on a respective shaft 9 which is connected between rods 10 that project radially from the support surface 4, as seen in plan view of the platform 1. To set the spacing between the support surface 4 and the sheet 3, the rods 10 are inclined to the support platform 4, as seen in radial section of the platform 1 (FIG. 1). Thereby, the frame 2 does not fill out the entire space within the sheet 3 but defines a hollow shell in the generate shape of an inverted tray. This design provides a stable, yet low-weight structure of the platform 1.

Figure 3:
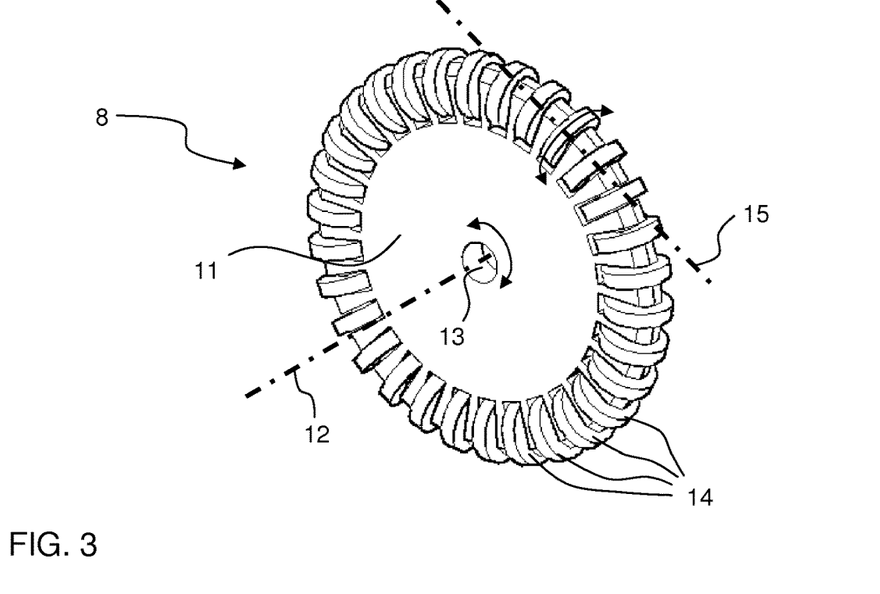
FIG. 3 is a perspective view of an omnidirectional wheel for use in the treadmills of FIGS. 1 and 2.

Since the movement of the sheet 3 is omnidirectional in relation to the support surface 4, the sheet 3 will slide over the inner rollers 8 in all directions as well. To reduce friction between the edge surface 6 and the sheet 3, the inner rollers 8 are preferably configured as so-called omnidirectional wheels (also known as "omni wheels"). An example of an omni wheel 8 is shown in FIG. 3. The omni wheel comprises a disc-shaped body or disc 11 with a main axis 12 extending through a center mounting hole 13 and has idler rollers 14 arranged around the circumference of the body 11. The idler rollers 14 are freely rotatable around a respective minor rotation axis 15 (only one shown in FIG. 3) which is perpendicular to the main axis 12 and oriented in a tangential direction of the circumference. Omni wheels are commercially available standard components which come in many different variants which may be installed in the platform of FIGS. 1-2, e.g. with respect to the dimensions of the idler rollers 14, the number of idler rollers 14 and the number of discs 11.

The movement of the sheet 3 is actuated by a number of drive units 20 that are distributed, preferably uniformly, around the perimeter of the platform 1 to engage the sheet 3 by frictional contact. Specifically, each drive unit 20 is arranged in abutment to the rounded edge surface 6 so as to establish the frictional contact. Thus, in the example of FIGS. 1 and 2, the inner rollers 8 form abutment elements for the drive units 20. To achieve an omnidirectional movement of the sheet 3, the number of drive units 20 is at least three, but could be larger for improved motion control. The example in FIG. 2 has three uniformly drive units 20, whereas the example in FIG. 1 has four drive units 20, arranged in opposite pairs, of which one pair has been omitted for clarity of presentation. As shown in FIGS. 1 and 2, each drive unit 20 comprises a drive roller 21, which has the general shape of a cylinder. The cylinder has a first rotation axis R1 at its symmetry line (centerline) and defines a lateral surface which is brought in contact with the sheet 3. To improve frictional contact between the drive roller 21 and the sheet 3, the outer surface of the sheet 3 may be provided with a high-friction structure/layer. Likewise, the lateral surface of the drive rollers 21 may be provided with a high-friction surface structure/layer. The drive roller 21 is fixedly connected to the drive shaft 22 of a first electrical motor 23 which is operable to rotate the drive shaft 22 and thereby the drive roller 21. The motor 23 is operable to control the direction of rotation as well as the speed of rotation. In certain implementations, the motor 23 may also be operable to allow the drive roller 21 to rotate freely around the rotation axis R1.

Each drive unit 20 further comprises a second electrical motor 24, which is indirectly or directly connected to the drive roller 21 to rotate the drive roller 21 around a second rotation axis R2, which is perpendicular to the first rotation axis R1. The drive unit 20 is installed with the second rotation axis R2 extending in a radial direction of the platform, as seen in plan view (FIG. 2). Further, the drive unit 20 is installed such that the drive roller 8, and thus the first rotation axis R1, is rotated by the second motor 24 essentially in the tangential plane of the edge surface 6 at the region of contact between the drive roller 21 and the sheet 3. Thereby, a maximum contact area is established between the cylindrical surface of the drive roller 21 and the sheet 3 as the drive roller 21 is rotated around the second rotation axis R2.

Figure 5:
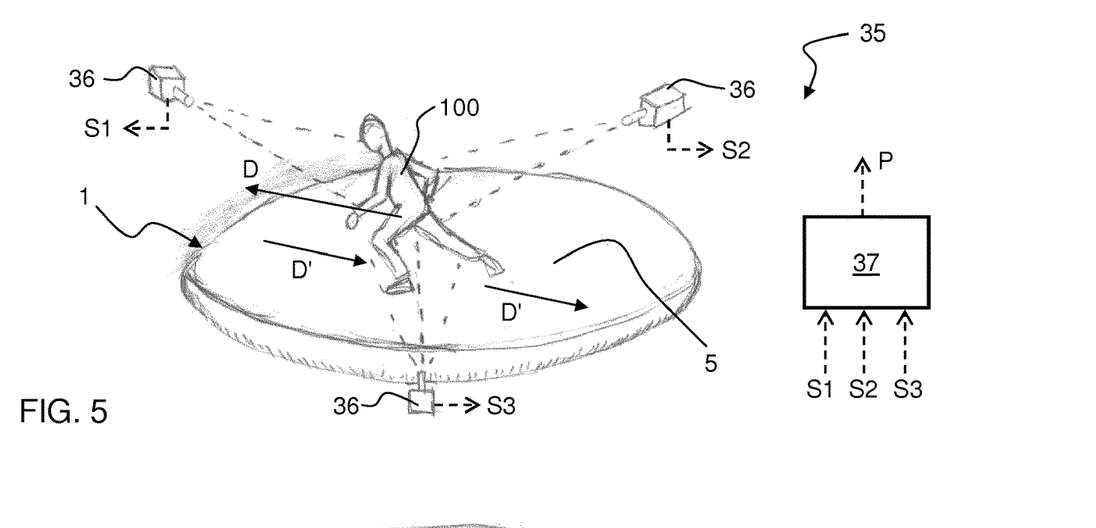
FIG. 5 is a perspective view of a positioning system arranged in relation to a treadmill.

The drive units 20 collectively define a drive arrangement which is operated by a controller 30 to generate a desired speed and direction of movement of the sheet 3 at a given location on the active surface 5. As indicated in FIG. 2, the controller 30 receives position data P for the user on the active surface 5 and generates control signals C1-C6 for the motors 23, 24, typically to maintain the user at the given location on the active surface 5, and may also generate control signals C7-C10 to set the inclination of the platform 1 in relation of the direction of gravity, e.g. based on input data from a VR (Virtual Reality) system. The position data P may include, or allow the controller 30 to calculate, a momentary direction and speed of the user in relation to a reference location. The controller 30 is typically configured to operate one or more control loops on the position data P to determine the control signals C1-C6. The position data P may be generated by a positioning system which is associated with or integrated in the platform. FIG. 5 shows an example of a camera-based positioning system 35, which includes three cameras 36 arranged to produce images of the active surface 5, and a user 100 thereon, from three different angles. The cameras 36 generate image signals S1-S3 which are received and processed by a positioning unit 37 by techniques well-known to the skilled person to generate the position data P. As indicated in FIG. 5, when the position data P indicates that the user 100 moves in a direction D, the controller generates control signals (e.g. C1-C6) for the drive arrangement to drive the sheet in the opposite direction D' so as to counteract the locomotion of the user 100. The positioning system 35 may be of any type and use any type and number of detectors, including ultrasonic transducers, pressure or force sensors integrated into or attached to the support surface, accelerometers attached to the user, signal emitters or signal receivers attached to the user, etc. As a further example (not shown), the user may wear a harness attached by a strut to a supporting structure above the user, the supporting structure including sensors for mechanically sensing the momentary position of the strut in a two-dimensional plane at the supporting structure overlying the active surface. Such a combination of a harness, strut and supporting structure is e.g. shown in the above-mentioned U.S. Pat. No. 6,152,854.

Figure 4:
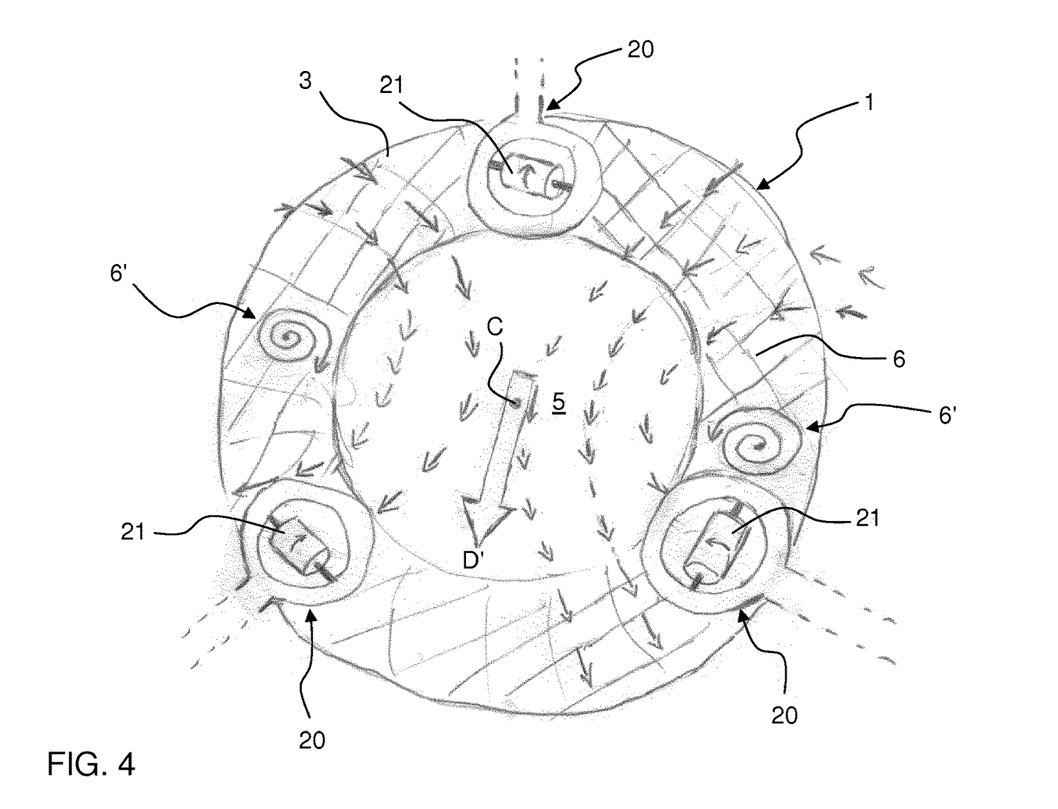
FIG. 4 is a top plan view of an omnidirectional treadmill with a platform illustrated with fictionally upturned edge surface to illustrate local movement of an outer sheet on the platform.

Reverting to FIG. 2, the controller 30 operates the first motors 23 to impart a desired driving force at the region of frictional contact between the respective drive unit 20 and the sheet 3, and operates the second motors 24 to set a desired direction for the driving force at the region of frictional contact. It is understood that the controller 30 operates based on an algorithm that jointly determines the desired force and direction at all regions of frictional contact so as to generate a desired movement (direction and speed) at the specific location on the active surface 5. This joint control is further illustrated in FIG. 4, which is similar to FIG. 2 but differs in that the edge surface 6 has been fictionally folded into the plane of the active surface 5 to better illustrate the movement of the sheet 3. To cause the sheet at the center C of the platform 1 to move in the direction D' indicated by the bold arrow, the two drive units 20 at the bottom of FIG. 4 are set to operate their first motors (not shown) to rotate the drive rollers 21 so as to impart a respective downward force to the sheet 3, in a respective direction set by their second motors (not shown), and the drive unit 20 at the top of FIG. 4 is either set to operate its first motor (not shown) to rotate the drive roller 21 so as to impart an upward force to the sheet 3 or to allow the drive roller to rotate freely, in a direction set by its second motor (not shown). The resulting local movement of the sheet 3 is indicated by short arrows.

It may be noted in FIG. 4 that a local rotation of the sheet occurs in confined regions 6' of the edge surface 6. Returning to FIG. 1, these confined regions 6' will mainly occur at or near the vertical center of the edge surface 6, i.e. in a horizontal plane H which extends through the center of the inner rollers (cf. FIG. 1). Even if it is conceivable to locate the drive units 20 to establish the frictional contact in the horizontal plane H, it currently believed that the drive units 20 should be displaced from this horizontal plane H to ensure that the drive rollers 21 do not come into contact with any confined regions 6' of local rotation. In the example of FIG. 1, the drive rollers 21 are therefore arranged to engage the edge surface 6 of the platform 1 at a location displaced from the horizontal plane H.

In the specific example of FIG. 1, the drive units 20 are arranged for abutment on the edge surface 6 at a location above the horizontal plane H. The platform 1 is supported by outer support elements or outer rollers 25, which are freely rotatable around a respective main axis. The outer rollers 25 are distributed around the perimeter of the platform 1 and are located to carry the weight of the platform 1 (and the user 100). The outer rollers 25 may but need not be co-located with the drive rollers 21, and the outer rollers 25 and the drive rollers 21 may or may not be attached to a common support rod 26. As seen in FIG. 1, the region of contact between the platform 1 and the outer rollers 25 will be displaced from the horizontal plane H. Since the movement of the sheet 3 is omnidirectional, the sheet 3 will slide over the outer rollers 25 in all directions during use of the treadmill. To reduce friction between the edge surface 6 and the sheet 3, the outer rollers 25 are preferably configured as omni wheels (FIG. 3). Alternatively or additionally, the surface of the outer rollers 25 may be provided with a low-friction surface coating/structure. The arrangement of the drive roller 21 and the outer rollers 25 on opposite sides of the horizontal plane H has the additional advantage of restraining vertical movement of the platform 1. For example, the vertical movement may be caused by the user 100 jumping on the platform 1, or by the platform 1 being elevated or lowered by vertical motors (below). To further restrict vertical movement, the controller 30 may operate the drive arrangement so that a downward force is imparted to the platform 1 by each of the drive rollers 21. In the example of FIG. 4, this may be achieved by slightly restricting the movement of the sheet 3 at the top-most drive roller 21, e.g. by operating this drive roller 21 at a slightly reduced rotational speed compared to the local movement of the sheet 3 imparted by the other drive rollers 21. Reverting to FIG. 1 and the second implementation with slacked sheet 3 (dashed lines), the sheet 3 may be tensioned across the support surface 4 by forces imparted by the drive rollers 21.

In an alternative embodiment, positions of the drive rollers 21 and the outer rollers 25 are switched in relation to FIG. 1, so that the outer rollers 25 and the drive rollers 21 engage the sheet 3 above and beneath the horizontal plane H, respectively. Thereby, the outer rollers 25 may serve to limit vertical movement of the platform 1. However, it is also conceivable to omit the outer rollers 25, since the weight of the platform 1 is carried by the drive rollers 21.

Figure 6:
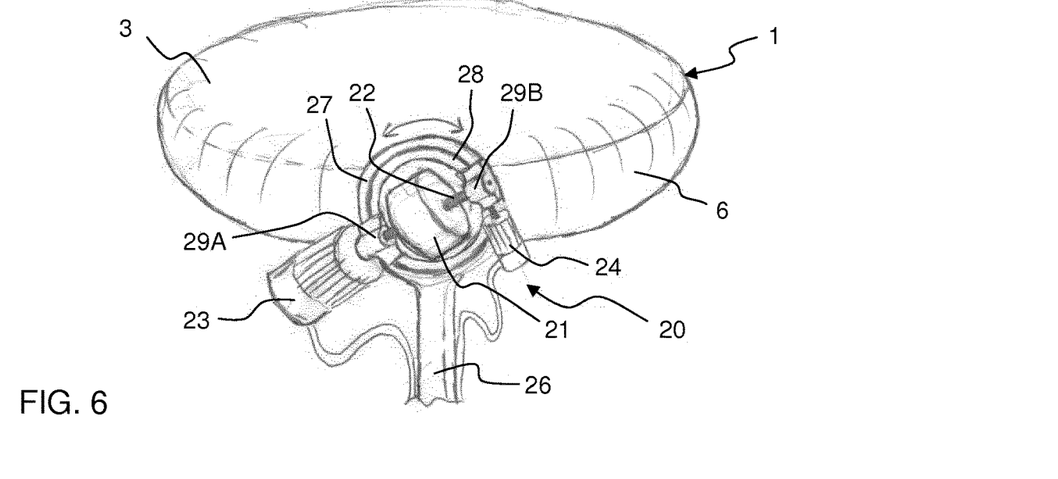
FIG. 6 is a perspective view of an example implementation of a drive unit for a treadmill.

FIG. 6 shows an implementation example of a drive unit 20 which is configured to define the above-mentioned first and second axes and control the rotation of the drive roller 21 around these axes. The drive unit 20 comprises a vertical support rod 26 with a ring-shaped end portion 27. A ring element 28 is connected to the end portion 27 in concentric arrangement for rotation around the center point of the ring-shaped end portion 27. The drive roller 21 is fixedly attached to the drive shaft 22 of the first motor 23 and is journaled for rotation in holders 29A, 29B fixedly attached to the ring element 28. The holder 29B comprises a conventional gear transmission (not shown) which connects the drive shaft of the second motor 24 to the ring element 28, so as to convert the rotation of the second motor 24 into a rotation of the ring element 28 element in relation to the end portion 27. Thus, by rotation of the second motor 24, the drive roller 21 is rotated around a second axis defined by the orientation of the ring-shaped end portion 27.

In all embodiments and examples disclosed herein, the first motor 23 may be located within the drive roller 21, resulting in a more compact design of the drive unit 20 and reducing the mechanical torque required to rotate the drive roller 21 around the second axis.

Figure 7:
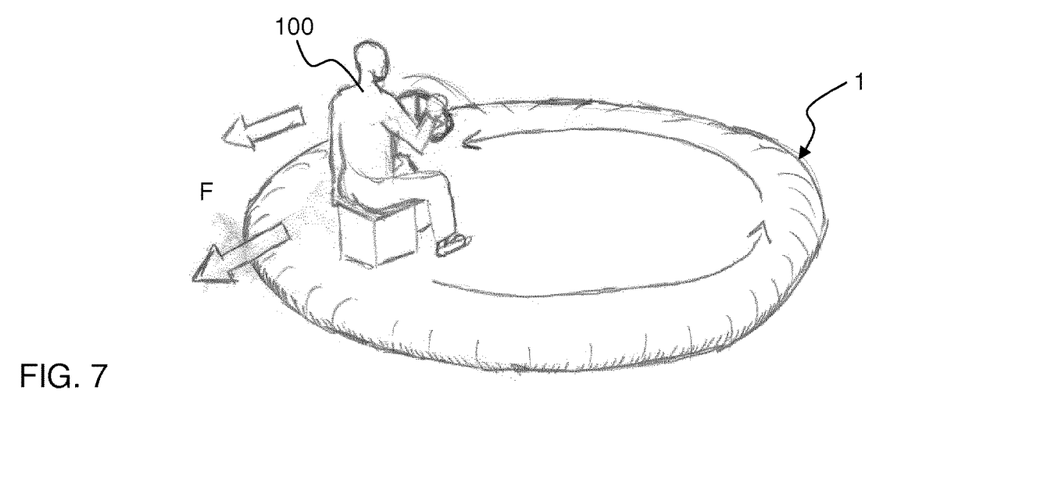
FIG. 7 is a perspective view of a user on a rotating platform.

A design of the drive unit 20 that allows the drive roller 21 to be rotated about first and second axes as described in the foregoing and exemplified in FIG. 6 also allows the controller 30 to rotate the platform 1 about its center, e.g. by operating all of the drive units 20 to generate force components that are parallel to the horizontal plane H of the platform (FIG. 1) and thereby collectively drive the platform into rotation. It should be understood that the controller 30 may both impart such a rotation and control the location of the user by moving the sheet 3 around the platform 1. FIG. 7 shows an example in which the user 100 is located off-center and the platform 1 is rotated to subject the user to centrifugal forces F, e.g. to impart an illusion of acceleration during a virtual experience of driving a car. Furthermore, an illusion of linear acceleration/retardation may be achieved by controlling the movement of the sheet 3 in any given direction at the location of the user 100 on the platform 1. The rotation of the platform may also be used to disentangle any cables or wires (not shown) that may be connected to equipment worn by the user, e.g. a head mounted display (below). Such cables or wires would typically be attached to a support structure above the user and may become twisted as the user moves around on the active surface 5. The controller 31 may be operated to slowly rotate the platform 1, continuously or intermittently, to counteract such twisting of the cables.

Returning to FIG. 1, the platform 1 and the drive units 20 are carried by a floor-mounted chassis 40. The chassis 40 is configured to allow adjustment of the angle of the supporting surface 4, i.e. the inclination of the active surface 5, by adjustment of the angle of the platform 1. To this end, the chassis 40 includes vertical floor motors 41 that are connected to the vertical support rods 26 that carry the drive units 20 (e.g. as shown in FIG. 6). The floor motors 41 are controllable by control signals C7, C8 to displace the support rods 26 in the vertical direction, so as to set the required vertical level of the respective drive unit 20 for achieving a desired inclination of the active surface 5 and/or for simulating underlay movement. It should be noted that the horizontal extent of the platform 1 changes with inclination. To compensate for this effect, and to ensure adequate contact between the drive units 20 and the platform 1, the chassis 40 includes horizontal floor motors 42 that are controllable by control signals C9, C10 to change the distance between the support rods 26 and thereby between the drive units 20. The floor motors 41, 42 may be linear motors.

Figure 8A:
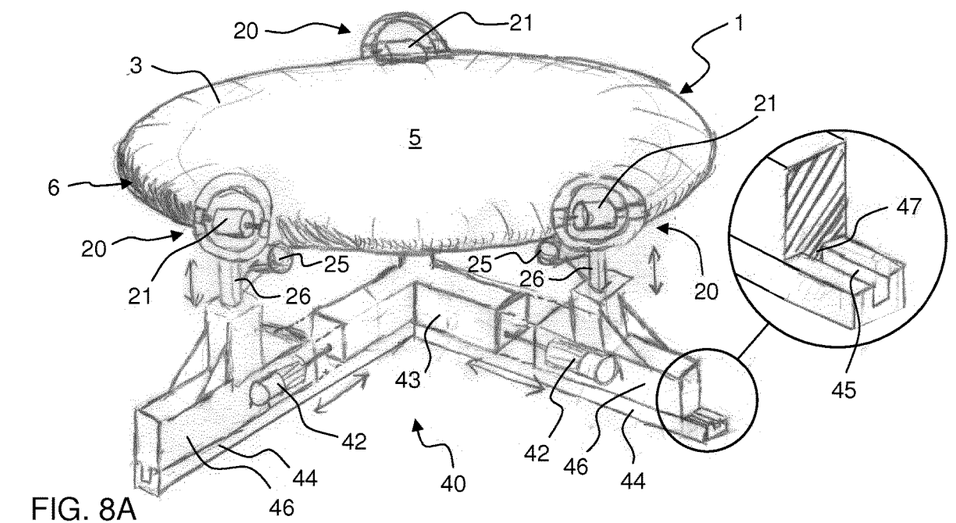
FIG. 8A is a perspective view of an omnidirectional treadmill with a chassis for ground support.

One implementation example of such a chassis 40 is shown in FIG. 8A. The chassis 40 comprises a base structure 43 having radially extending leg portions 44 that rest on the floor and each define a linear guide track 45 facing upwards. Each leg portion 44 is arranged to carry one drive unit 20. A respective support block 46 is slidably arranged on the leg portion 44 with a projecting rail 47 arranged in the linear guide track 45 (shown in enlarged view). Each support block 46 includes one vertical floor motor (not shown) and one horizontal floor motor 42. The horizontal floor motor 42 is connected by a shaft to the base structure 43 so as to impart a controlled linear movement of the support block 46 in relation to the base structure 43. In a variant (not shown), the horizontal motors 42 are replaced by springs that are pre-loaded towards the base structure 43 so that the support blocks 42 are automatically displaced towards the base structure 43 when the platform 1 is inclined. Each vertical floor motor is connected to the vertical support rod 26 that carries the respective drive unit 20 to impart a controlled linear movement of the drive unit 20 in relation to the support block 46 and the base structure 43.

Figure 8B:
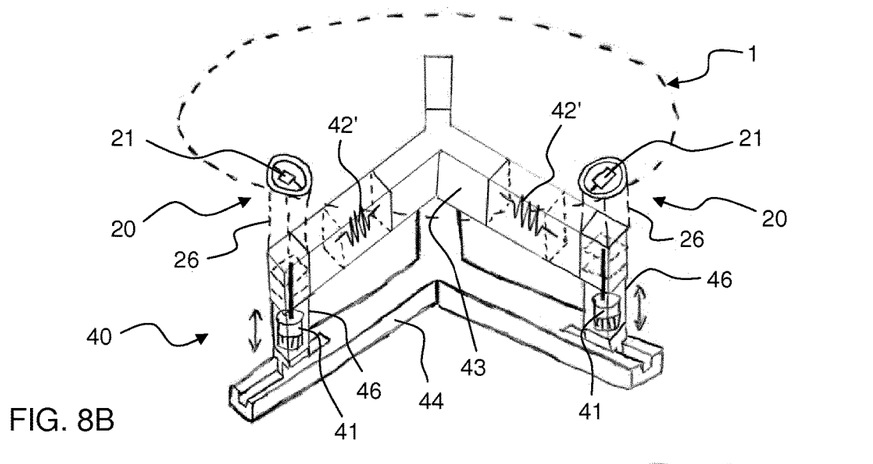
FIG. 8B shows a variant of the chassis in FIG. 8B.

A variant of the chassis 40 is shown in FIG. 8B. The chassis 40 in FIG. 8B is configured to maintain the local orientation of the respective drive roller 21 with respect to the platform 1 (indicated by dashed lines) irrespective of the inclination of the platform 1. This is achieved by ensuring that the drive units 20 (only two shown) are inclined in unison with the platform 1. In the example of FIG. 8B, the support rods 26 (schematically indicated by dashed lines) are rigidly attached to the base structure 43, which forms an intermediate part that is physically separated from and supported by an underlying floor-mounted leg structure 44. Vertical floor motors 41 are arranged on the leg structure 44 and connected to the base structure 43 so as to individually adjust the spacing between the leg structure 44 and the base structure 43. Thereby, as the respective vertical motor 41 is operated to locally change the vertical distance between the leg structure 44 and the base structure 43, the assembly of the base structure 43, the support rods 26 and the drive units 20 will be inclined in unison. In the specific example of FIG. 8B, the base structure 43 defines radially extending leg portions that are arranged to co-extend with leg portions of the underlying leg structure 44. The vertical motors 41 are installed in supporting blocks 46, which are slidably arranged on the leg portions of the leg structure 44, and the vertical motors 41 are connected to distal end portions of the base structure 43. These distal end portions are displaceable in the radial direction of the base structure 43, to compensate for changes in horizontal extent of the platform 1 with inclination. In the illustrated example, the radial position the respective distal end portion is adjusted by springs 42', although horizontal motors may be used by analogy with FIG. 8A.

Figure 9:
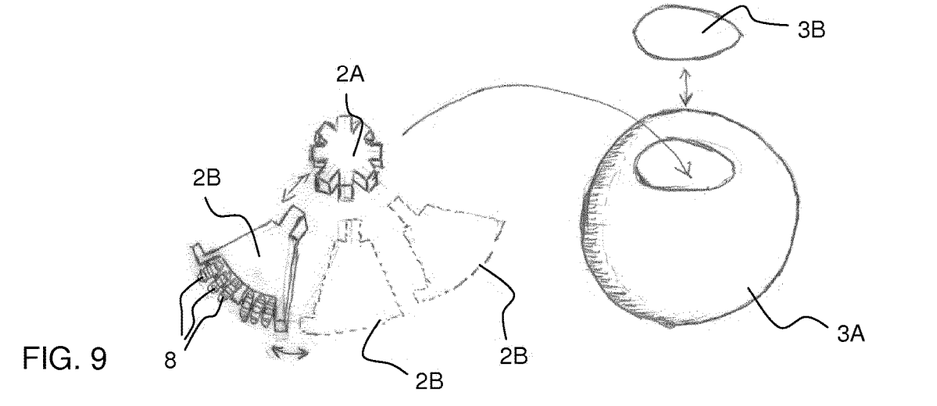
FIG. 9 is a perspective view of a set of elements for assembly of a platform for an omnidirectional treadmill.

FIG. 9 illustrates a kit of building blocks that may be assembled to form the platform 1 of the omnidirectional treadmill. The kit comprises one center part 2A and a plurality of wedge-shaped peripheral parts 2B (only three indicated in FIG. 9). In the illustrated example, the peripheral parts 2B are supplied with pre-mounted inner rollers 8 to facilitate assembly. The center part 2A and the peripheral parts 2B have cooperating locking elements that allow the peripheral parts 2B to be fixedly connected to each other and to the center part 2A to form the frame 2. The kit further comprises a first bag-shaped sheet part 3A, which defines a mounting hole, and a second lid-shaped sheet part 3B, which is adapted for attachment to the first sheet part 3A so as to seal the mounting hole. In both the first and second implementations of the sheet 3 (FIG. 1), the first sheet part 3A is preferably shaped as a sphere. To assemble the platform 1, the center part 2A and the peripheral parts 2B are introduced into the first sheet part 3A through the mounting hole and connected to each other inside the first sheet part 3A. When the frame 2 is completed inside the first sheet part 3A, the second sheet part 3B is attached to the first sheet part 3A, e.g. by gluing or ultrasonic welding, to cover the mounting hole.

Figure 10:
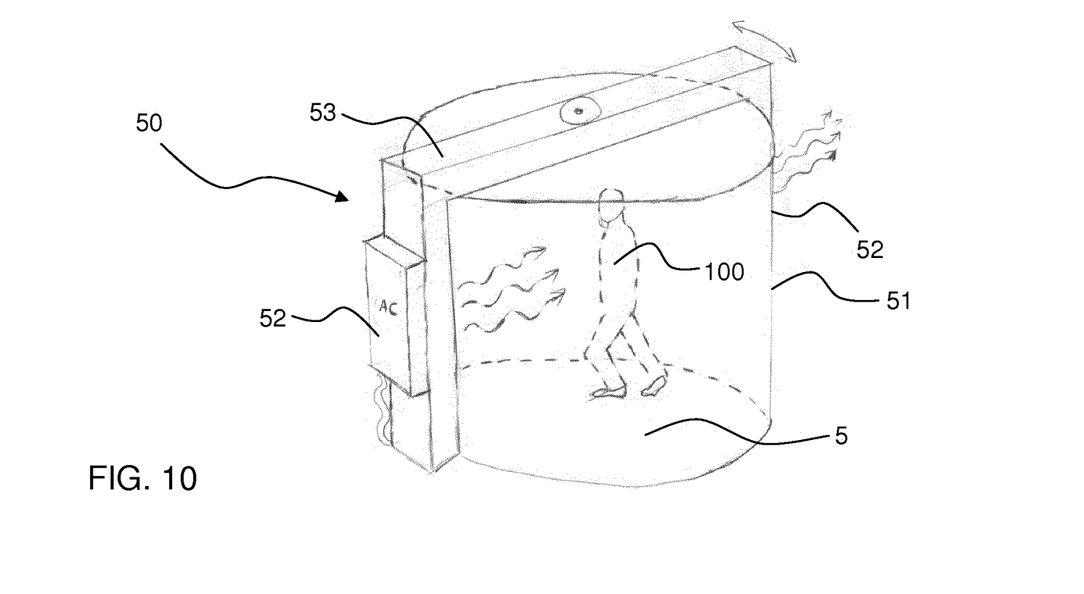
FIG. 10 is a perspective view of a climate chamber for use with a treadmill.

FIG. 10 illustrates a climate chamber 50 that may be combined with a treadmill of any configuration, including the omnidirectional treadmill disclosed herein. The climate chamber 50 is arranged on top of the treadmill to define an enclosure 51 around the active surface 5. The climate chamber 50 includes one or more air conditioners 52, which are operable to control the humidity, temperate and air speed in the enclosure 51. The air speed may simulate wind to the user 100. In the illustrated example, the climate chamber 50 comprises two air conditioners 52 which are arranged at opposite sides of the enclosure 51. The air conditioners 52 are mounted level with the expected location of the user 100 on an inverted U-shaped support frame 53. The U-shaped support frame 53 is operable to rotate around the center of the treadmill to control the air flow direction through the enclosure 51. To simulate wind, the air conditioners 52 may be controlled to generate a through-flow of air by matching the incoming and outgoing air flow rates of the air conditioners 52.

As noted above, the omnidirectional treadmill may be combined with a VR system to allow close coupling of the user's physical direction and velocity with that of the virtual world in which the user is navigating. Such a VR system might typically include a head mounted display (HMD) with speakers and microphone, and may also include one or more of data glove(s), a body sensing suit, exoskeletal joint angle sensors, and/or other related apparatus. The VR system would likely include a computer for image generation, sound generation, and processing of related data such as head and hand position. The omnidirectional treadmill is operated by the controller 30 (FIG. 2) in synchrony with the VR system by sending velocity and direction signals to the image generation computer. The computer uses the velocity vector thus provided to update what is shown to the user so that the user sees a visual image which takes into account this vector.

It may be noted that there are alternatives to using drive units 20 with drive rollers 21 that are rotatable around first and second axes. In one such alternative, not shown, a large number of drive units 20 with a respective drive roller 21 are arranged around the perimeter of the platform 1 with a fixed orientation with respect to the platform 1. Each drive unit 20 is operable to selectively engage the drive roller 21 with the edge surface 6 of the platform 1 to establish frictional contact and move the sheet 3 in a respective radial direction across the platform 1. Thus, each drive unit 20 is associated with a respective radial direction across the platform 1. To drive the active surface 5 in a specific direction with respect to the center of the platform 1, the controller 30 selects to engage the drive unit 20 that is associated with a radial direction that best matches the specific direction (or a pair of such drive units 20 arranged on opposite sides of the platform 1). This alternative is only able to generate a discrete set of movement directions of the active surface 5, and only in relation to the center of the platform 1. In practice, an excessive number of drive units 20 may be required to achieve adequate control of the user's position.

The invention claimed is:

1. An apparatus for allowing a user to move in an arbitrary direction, the apparatus comprising:
a frame that comprises a planar support surface for the user and defines a perimeter as seen in a direction towards the planar support surface,
a continuous sheet arranged to enclose the frame while extending along the planar support surface so as to define a moveable, active surface overlying the planar support surface, and
a drive arrangement arranged in frictional contact with the sheet so as to cause the continuous sheet, and thereby the active surface, to be driven in a given direction in relation to the planar support surface,
wherein the drive arrangement comprises at least three drive units distributed around the perimeter of the frame, each drive unit comprising a drive roller arranged to rotatingly engage the sheet in abutment to a circumferential edge surface of the frame so as to establish the frictional contact with the continuous sheet,
wherein the respective drive unit is configured for rotation of the drive roller around a first axis, which is a symmetry axis of the drive roller,
wherein the respective drive unit is further configured for rotation of the drive roller around a second axis, which is perpendicular to the first axis,
wherein the respective drive unit is arranged with the second axis being located in a radial direction of the frame as seen in a direction towards the planar support surface, the second axis being fixed in the radial direction during rotation of the first axis for each driven direction of the sheet, and
wherein the respective drive unit comprises a first motor arranged to rotate the drive roller around the first axis and a second motor arranged to rotate the drive roller around the second axis, the first motor being integrated within the drive roller.

2. The apparatus of claim 1, wherein the respective drive unit is arranged with the second axis being essentially perpendicular to a tangential plane of the circumferential edge surface at the location of the frictional contact between the drive roller and the continuous sheet.

3. The apparatus of claim 1, wherein the drive unit is arranged such that the rotation of the drive roller around the first axis drives the continuous sheet, and the rotation of the drive roller around the second axis at least partly controls the continuous sheet to be driven in the given direction.

4. The apparatus of claim 1, wherein the frame comprises a plurality of rotatable inner support elements arranged in surrounding relation to the planar support surface to define the circumferential edge surface of the frame, wherein the drive roller of the respective drive unit is arranged to rotatingly engage the continuous sheet in abutment to one or more of the rotatable inner support elements so as to establish the frictional contact with the continuous sheet.

5. The apparatus of claim 4, wherein each of the rotatable inner support elements comprises one or more omnidirectional wheels and is arranged to allow the continuous sheet to move in any direction in contact with the respective rotatable inner support element.

6. The apparatus of claim 4, wherein the rotatable inner support elements are arranged such that a top of the circumferential edge surface is level with or extend slightly above the planar support surface.

7. The apparatus of claim 4, further comprising a plurality of rotatable outer support elements arranged to engage the continuous sheet in abutment to the rotatable inner support elements.

8. The apparatus of claim 7, wherein center points of the rotatable inner support elements are located in a horizontal plane, and wherein at least one of the drive rollers or the rotatable outer support elements are arranged in abutment to the rotatable inner support elements beneath the horizontal plane.

9. The apparatus of claim 7, wherein at least a subset of the rotatable outer support elements are included in the drive units.

10. The apparatus of claim 7, wherein each of the rotatable outer support elements comprises one or more omnidirectional wheels and is arranged to allow the continuous sheet to move in any direction in contact with the respective rotatable outer support element.

11. The apparatus of claim 7, wherein the frame is generally shaped as an inverted tray, wherein a bottom of the tray defines at least part of the planar support surface, and wherein holders for the plurality of rotatable inner support elements project from the bottom to generally define a sidewall of the tray.

12. The apparatus of claim 1, wherein at least one of the planar support surface or an inner surface of the continuous sheet facing the planar support surface is configured to reduce contact friction.

13. The apparatus of claim 1, wherein the planar support surface comprises a plurality of freely rotatable spherical balls located in seats that are dispersed across the planar support surface.

14. The apparatus of claim 1, further comprising a positioning system for determining a current position of the user on the active surface, and a controller configured to control the drive arrangement, based on the current position of the user, to move the continuous sheet so as to set the user in a given position within the active surface.

15. The apparatus of claim 14, wherein the drive units are included in a floor-mounted chassis comprising displacement units for imparting a movement of the respective drive unit in a vertical direction and in a horizontal direction, respectively, and wherein the controller is operable to control at least a subset of the displacement units to cause a movement of at least one of the drive units in the vertical direction to impart an inclination of the frame and to cause a movement of one or more of the drive units in the horizontal direction to maintain the frictional contact between the drive rollers and the continuous sheet.

16. The apparatus of claim 15, wherein the floor-mounted chassis comprises a floor-mounted part and an intermediate part which is spaced from the floor-mounted part, wherein the drive units are attached to the intermediate part, and wherein the displacement units for causing the movement of the respective drive unit in the vertical direction are arranged to interconnect the floor-mounted part and the intermediate part and are operable, by the controller, to impart said inclination to the intermediate part, and thereby to the drive units and the frame.

17. The apparatus of claim 1, wherein the rotation around the second axis is independent from the rotation around the first axis.

18. An apparatus for allowing a user to move in an arbitrary direction, the apparatus comprising:
- a frame that comprises a planar support surface for the user and defines a perimeter as seen in a direction towards the planar support surface,
- a continuous sheet arranged to enclose the frame while extending along the planar support surface so as to define a moveable, active surface overlying the planar support surface,
- a drive arrangement arranged in frictional contact with the sheet so as to cause the continuous sheet, and thereby the active surface, to be driven in a given direction in relation to the planar support surface;
- a positioning system for determining a current position of the user on the active surface; and
- a controller configured to control the drive arrangement, based on the current position of the user, to move the continuous sheet so as to set the user in a given position within the active surface,
- wherein the drive arrangement comprises at least three drive units distributed around the perimeter of the frame, each drive unit comprising a drive roller arranged to rotatingly engage the sheet in abutment to a circumferential edge surface of the frame so as to establish the frictional contact with the continuous sheet,
- wherein the respective drive unit is configured for rotation of the drive roller around a first axis, which is a symmetry axis of the drive roller,
- wherein the respective drive unit is further configured for rotation of the drive roller around a second axis, which is perpendicular to the first axis,
- wherein the respective drive unit is arranged with the second axis being located in a radial direction of the frame as seen in a direction towards the planar support surface, the second axis being fixed in the radial direction during rotation of the first axis for each driven direction of the sheet,
- wherein the respective drive unit comprises a first motor arranged to rotate the drive roller around the first axis and a second motor arranged to rotate the drive roller around the second axis, and
- wherein the controller is further configured to collectively operate the drive rollers to impart a downward force onto the frame by the frictional contact.

19. An apparatus for allowing a user to move in an arbitrary direction, the apparatus comprising:
- a frame that comprises a planar support surface for the user and defines a perimeter as seen in a direction towards the planar support surface,
- a continuous sheet arranged to enclose the frame while extending along the planar support surface so as to define a moveable, active surface overlying the planar support surface,
- a drive arrangement arranged in frictional contact with the sheet so as to cause the continuous sheet, and thereby the active surface, to be driven in a given direction in relation to the planar support surface;
- a positioning system for determining a current position of the user on the active surface; and
- a controller configured to control the drive arrangement, based on the current position of the user, to move the continuous sheet so as to set the user in a given position within the active surface,
- wherein the drive arrangement comprises at least three drive units distributed around the perimeter of the frame, each drive unit comprising a drive roller arranged to rotatingly engage the sheet in abutment to a circumferential edge surface of the frame so as to establish the frictional contact with the continuous sheet, the drive units being included in a floor-mounted chassis comprising displacement units for imparting a movement of the respective drive unit in a vertical direction and in a horizontal direction, respectively,
- wherein the controller is operable to control at least a subset of the displacement units to cause a movement of at least one of the drive units in the vertical direction to impart an inclination of the frame and to cause a movement of one or more of the drive units in the horizontal direction to maintain the frictional contact between the drive rollers and the continuous sheet,
- wherein the respective drive unit is configured for rotation of the drive roller around a first axis, which is a symmetry axis of the drive roller,
- wherein the respective drive unit is further configured for rotation of the drive roller around a second axis, which is perpendicular to the first axis,
- wherein the respective drive unit is arranged with the second axis being located in a radial direction of the frame as seen in a direction towards the planar support surface, the second axis being fixed in the radial direction during rotation of the first axis for each driven direction of the sheet, and
- wherein the respective drive unit comprises a first motor arranged to rotate the drive roller around the first axis and a second motor arranged to rotate the drive roller around the second axis.

20. The apparatus of claim 19, wherein the floor-mounted chassis comprises a floor-mounted part and an intermediate part which is spaced from the floor-mounted part, wherein the drive units are attached to the intermediate part, and wherein the displacement units for causing the movement of the respective drive unit in the vertical direction are arranged to interconnect the floor-mounted part and the intermediate part and are operable, by the controller, to impart said inclination to the intermediate part, and thereby to the drive units and the frame.

* * * * *